US006539894B1

(12) United States Patent
Byrne et al.

(10) Patent No.: US 6,539,894 B1
(45) Date of Patent: Apr. 1, 2003

(54) AQUACULTURE FARM SYSTEM AND METHOD

(75) Inventors: Paul S. Byrne, San Jose, CA (US); William J. Kirkwood, Carmel, CA (US)

(73) Assignee: Eagle Net Sea Farms, Inc., San Jose, CA (US)

( * ) Notice: Subject to any disclaimer, the term of this patent is extended or adjusted under 35 U.S.C. 154(b) by 0 days.

(21) Appl. No.: 09/967,788

(22) Filed: Sep. 28, 2001

(51) Int. Cl.[7] .............................................. A01K 61/00
(52) U.S. Cl. ...................... 119/234; 119/238; 119/240
(58) Field of Search ................... 119/234, 236, 119/238, 239, 240, 242

(56) References Cited

U.S. PATENT DOCUMENTS

| 3,741,159 | A | * | 6/1973 | Halaunbrenner | ............ 119/240 |
| 3,996,894 | A | | 12/1976 | Wiegardt, Jr. | |
| 4,182,270 | A | | 1/1980 | Fourcher | |
| 4,212,268 | A | | 7/1980 | Chapman | |
| 4,317,429 | A | | 3/1982 | Leighton et al. | |
| 4,395,970 | A | | 8/1983 | Kunkle et al. | |
| 4,854,774 | A | | 8/1989 | Streichenberger | |
| 5,628,280 | A | | 5/1997 | Ericsson | |
| 5,653,193 | A | * | 8/1997 | Marissal | ...................... 119/240 |
| 5,839,391 | A | | 11/1998 | Shaar | |
| 6,167,831 | B1 | * | 1/2001 | Watt et al. | .................... 114/322 |
| 6,230,646 | B1 | * | 5/2001 | Berry et al. | ................. 119/234 |

FOREIGN PATENT DOCUMENTS

FR 2649293 * 7/1989 .................. 119/238

\* cited by examiner

Primary Examiner—Charles T. Jordan
Assistant Examiner—Elizabeth Shaw
(74) Attorney, Agent, or Firm—Dorsey & Whitney LLP

(57) ABSTRACT

An aquaculture system for cultivation, containment and rearing of various mollusks, particularly abalone, which includes a habitat which supports a plurality of molded panels including openings for communicating between adjacent panels, whereby food is available throughout the habitat. An outer netting or open structure which allows water to flow through the habitat, but protects the mollusks from predators, while still containing the food and permitting the flow of water therethrough, selected ones of said panels being configured to provide buoyancy for the habitat which is tethered from the bottom of the ocean.

10 Claims, 9 Drawing Sheets

FIG_2

FIG_3

FIG_5

FIG_4

FIG_6

FIG_7

FIG_8

FIG_9

FIG_10

FIG_11

FIG_12

FIG_13

FIG_14

FIG_15

FIG_16

AQUACULTURE FARM SYSTEM AND METHOD

BRIEF DESCRIPTION OF THE INVENTION

This invention relates to an aquaculture farm system and method for the cultivation, containment and rearing of various mollusks, and abalone in particular.

DESCRIPTION OF PRIOR ART

The worldwide demand for various forms of shellfish from aquacultured sources continues to increase as natural sources are depleted. Responding to this demand, numerous nations and businesses have undertaken attempts to meet the demand by use of land-based aquaculture and limited at-sea aquaculture farming. As the demand has continued to increase, the cost-effectiveness of these older systems has deteriorated. Contributing to the cost is that at-sea systems normally require divers to maintain and hand-feed the animals in the farm habitats. Consequently, operations are dangerous, which results in high insurance costs. Labor and other costs have also increased, resulting in the decline of profits.

Prior art systems of at-sea aquacultural employing habitats are known. An example of such a prior art system is described in U.S. Pat. No. 4,182,270, in which the habitat is suspended from a buoy and the food is introduced into the habitat by divers. Each of the habitats includes corrugated panels which are placed within a porous container. The container has an opening for insertion and removal of the panels. The habitat is raised onto a pier for both the removal of the panels to harvest abalone and for cleaning of the panels. The floating habitat is exposed to the violence of storms. In other than storm conditions, the habitat moves with the water, which results in stagnant conditions within the habitat.

Another example is the submersible abalone habitat described in U.S. Pat. No. 4,395,970. The habitat has positive buoyancy and includes a tubular body having water-impervious walls with open ends. Screened means are removably mounted across the open ends of the tubular body and a flotation means is removably attached to the tubular body without obstruction of the open ends. A tether means is attached to one of the open ends of the tubular body for tethering the body and flotation means from an anchor or weight at the bottom of the sea. An egg-crate structure includes rectangular vertical walls which provide attachment means for the abalone. The habitat is suspended less than thirty feet from the surface to permit divers to reach the habitat for feeding and inspection. The habitat is hoisted to the surface for maintenance, cleaning and culling of abalone for distribution of the abalone to additional habitats. Because of the limited space, the egg-crate structure makes it difficult to reach the cell walls for harvest of abalone.

OBJECTS AND SUMMARY OF THE INVENTION

It is an object of the present invention to provide an improved, efficient aquaculture farming system, method and structure for the cultivation and production of shellfish, particularly abalone.

It is another object of the present invention to provide an ocean farming system which does not require divers.

It is a further object of the present invention to provide a habitat which includes removable panels configured for the growth of abalone.

The foregoing and other objects of the invention are achieved by a system which includes a habitat for housing the mollusks or abalone for feeding and protection from predators and a tether for suspending the habitat above the ocean floor. The habitat includes a plurality of vertically-arranged, removable, spaced, molded panels forming cells. Some of the panels provide buoyancy. The panels include horizontal ribs where the small abalone attach and openings so that food can travel through the panel from one cell to another or the abalone can move through the habitat. The openings also permit the easy flow of water through the habitat. A feeding system employs a feed pump at the surface and a hose which is positioned by a remotely-operated vehicle or an automated vehicle to be detachably coupled to individual habitats for introducing feed into the submerged habitats.

BRIEF DESCRIPTION OF THE DRAWINGS

The foregoing and other objects of the invention will be more clearly understood from the following description when read in conjunction with the accompanying drawings in which.

DESCRIPTION OF PREFERRED EMBODIMENT(S)

The aquaculture farm system, structure and method described herein provides a unique and improved method for the cultivation and mass production of mollusks, and particularly abalone. This same system is applicable to (but not limited to) other shell fish such as scallops, clams, oysters and other mollusks requiring a controlled aquaculture environment for commercial viability. Generally, the habitats of the present invention employ reusable plastic panels to accommodate each phase of the mollusk development. The plastic panels may be blow molded to provide an open interior. Each panel has a series of ribs running parallel to a horizontal line which provide necessary shelter and protection for juvenile abalone to cluster and feed safely. The panels are easily removable from the habitat to perform culling and harvesting operations. The panels can have a variety of shapes but each panel will include a series of random ovals, allowing mature adults to wander freely between panels and gain access to food. The open architecture allows water to freely exchange while an exterior netting or framework keeps the food within the habitat. The same exterior netting also allows the free exchange of water solving a long-time problem of maintaining healthy water conditions for the mollusks. The habitat structures are also able to be stacked for more efficient use of labor at sea. Each habitat is buoyed to support the mollusks over the entire cycle of growth by the use of panels in which the interior is filled with a flotation substance such as synthetic foam or by forming sealed panels with an air interior. The number of such panels is selected to displace the appropriate amount of water for flotation of the habitat. In the event that panels cannot provide enough flotation, additional flotation can be provided by foam or the like. The habitat is tethered to a concrete mass or anchor by a subsurface mooring line. Feeding is accomplished by using a feeding system which uses a surface pump carried usually by a ship or boat and a hopper and pump which supplies a large diameter hose with the appropriately sized feed, particularly kelp. The other end of the hose is selectively attached to various habitats by use of a commercially available remotely-operated vehicle (ROV). The hose is attached to each habitat by a unique mechanism allowing for sub-sea attachment, feeding and detachment as needed, to service an array of habitats from the surface without the necessity of divers. As a consequence, the habitats can be submerged at various depths, not limited by the depth to which divers can dive.

Figure 1:
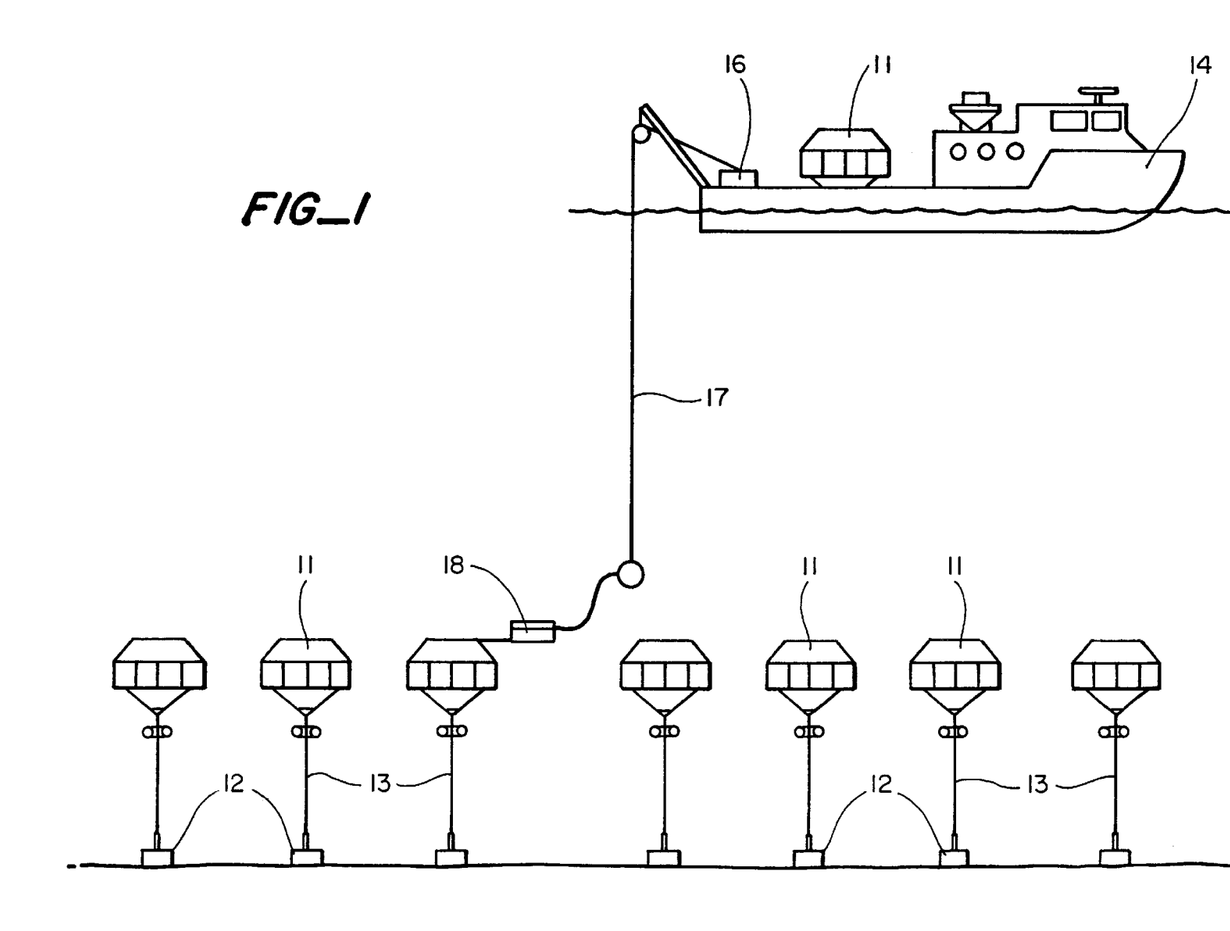
FIG. 1 schematically shows an aquaculture farm in accordance with one embodiment of the present invention.

Referring to FIG. 1, a plurality of habitats 11 are shown anchored to a concrete mass 12 by a mooring line 13. A vessel 14 navigates over the habitats. Food is processed on-board the vessel by the processing unit 16 and supplied to the habitats 11 via a feed hose 17. An ROV 18 guides the hose 17 into engagement with the individual habitats 11. An automated vehicle with lights, camera and thrusters may also be used. In any event, the habitats are serviced and fed without the use of divers.

Figure 2:
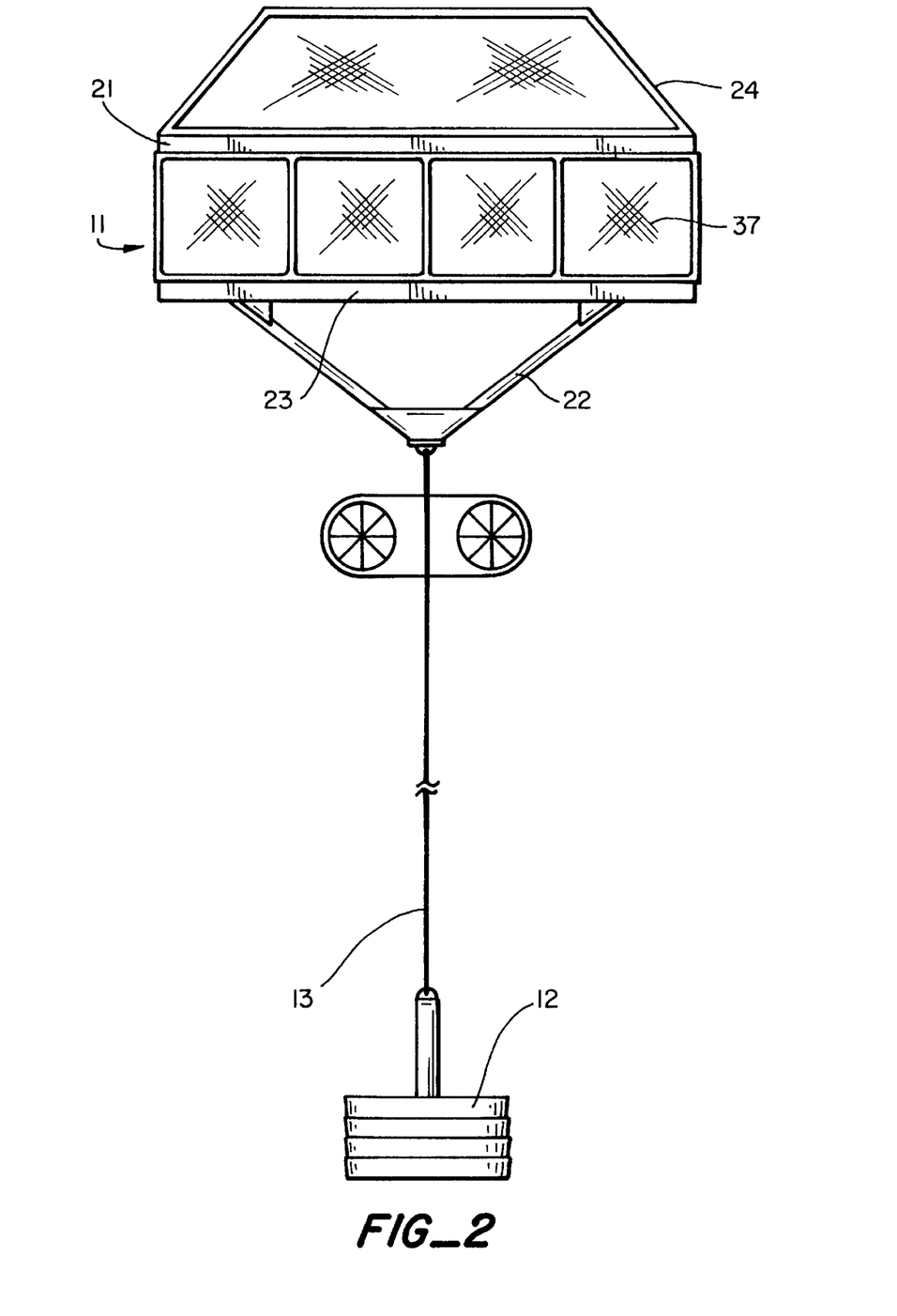
FIG. 2 is an enlarged view of one of the habitats of FIG. 1.

Referring to FIG. 2, each habitat includes a main, rectangular body 21, to be described, which includes panels onto which the mollusks may attach. Some of the panels may be buoyant to provide buoyancy to the habitat structure. The habitat is attached to the line 13 by brackets 22 secured to a bridge 23. The other end of the line is attached to the anchor or weight 12. The top of the habitat 24 includes a top 24 which includes interior baffles which distribute feed supplied to the top evenly throughout the interior of the rectangular habitat structure 21.

Figure 3:
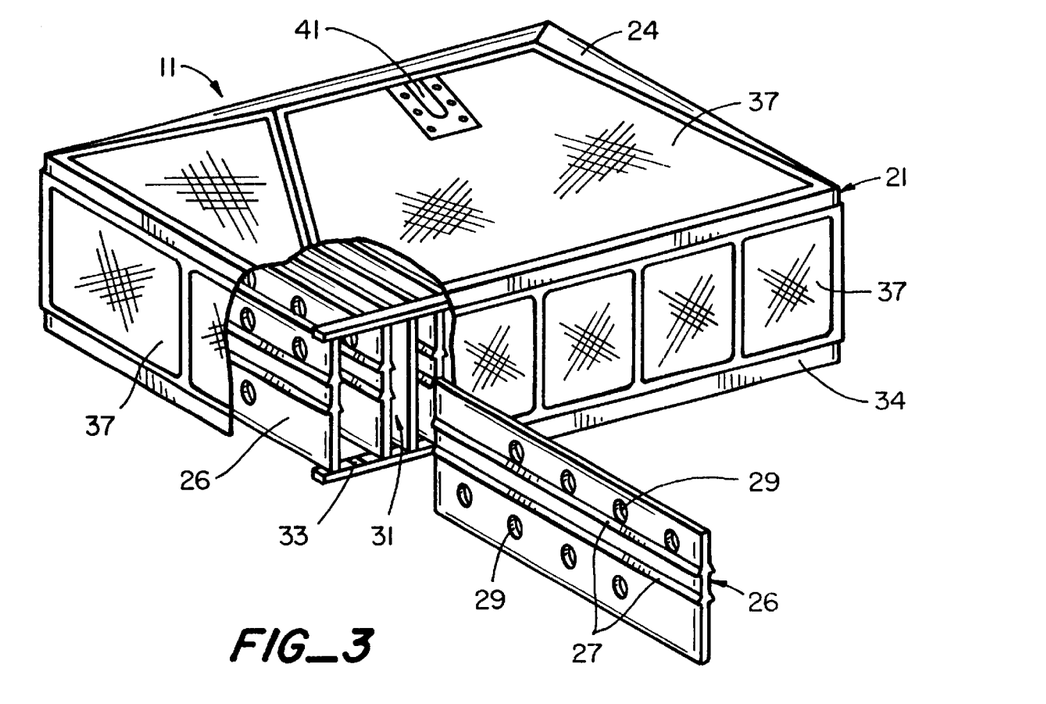
FIG. 3 is a perspective view of a rectangular habitat partially broken away to show the interior panels and cells.
Figure 7:
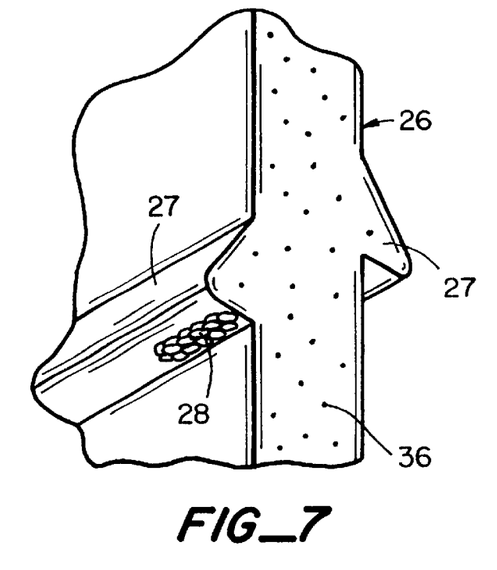
FIG. 7 is an enlarged view of the area 7—7 of FIG. 6.

Referring to FIG. 3, the rectangular habitat structure 21 includes a plurality of removable panels 26 for cultivating and rearing mollusks on its surface. The surface of each panel is textured and preferably includes horizontally extending ribs 27 of specific design for juvenile mollusks, specifically abalone, to congregate until reaching an adolescent stage. This is more clearly illustrated in the enlarged view of FIG. 7, wherein the juvenile abalone 28 are shown attached to the underside of the rib 27. Each panel has a pattern of spaced and sized holes or openings 29 to provide for distribution of food through panels to adjacent habitat cells 31 defined by the panels and top and bottom of the habitat and/or for the mollusks to travel between cells for food.

Figure 6:
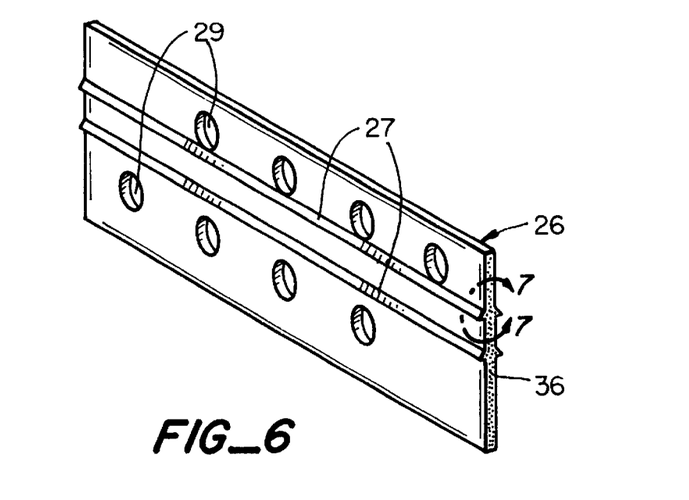
FIG. 6 is an enlarged perspective view of another of the panels used in the habitats of FIGS. 3 and 4, which is filled with foam for displacing water to provide buoyancy.

In the preferred embodiment, the panels 26 are composed of blow-molded plastic, though other modes of fabrication may be used. Polyethylene or similar plastic material can be employed. If required, Stiffeners (not shown) may be placed to provide additional rigidity to support the animal weight and environmental conditioners. The stiffeners can be constructed of an ultra-high molecular weight polyethylene or suitable substitute. Preferably, the stiffeners are molded in place during the manufacturing of the panel. Each edge of the panel is rounded to provide a locating surface and contour to slide into grooves 33 of the associated framework 34 for installation. Referring to FIG. 6, internal to some panels is a supplement of closed-cell foam 36 for buoyancy adjustment. Each habitat requires some quantity of buoyancy to account for system weight and water, and animal weight over a growth period. The foam insert 36 can be molded in place or poured into the panel during manufacture of the panel. Each mold insert is cut from a core of polyethylene closed-cell foam, but alternative methods may be used. The number of floating panels depends upon the depth requirements for the given type of mollusk to be cultivated. The number of foamed panels 27 also depends upon the final configuration of the habitat using weight and balance criteria.

Figure 4:
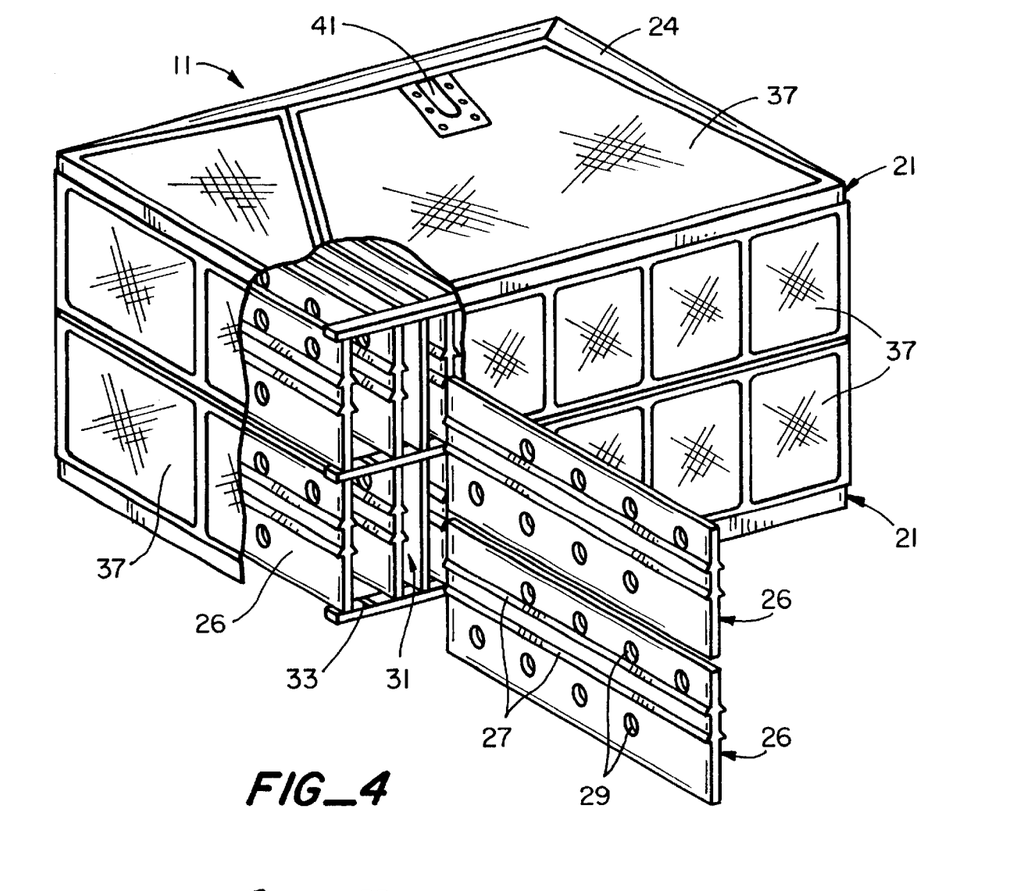
FIG. 4 is a perspective view of a two-tiered rectangular habitat partially broken away to show the interior panels and cells.
Figure 5:
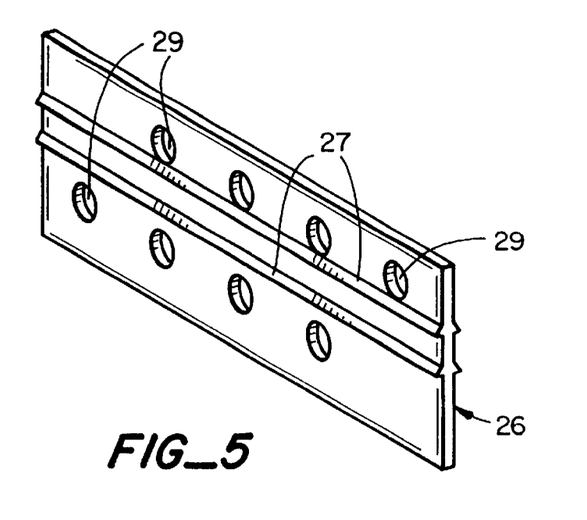
FIG. 5 is an enlarged perspective view of one of the panels used in the habitats of FIGS. 3 and 4.

The habitat framework 34 may be composed of aluminum or other suitable corrosion-resistant material or plastic support structure. The sides of the framework are open with rails 33 for receiving, guiding and supporting the panels. Referring to FIGS. 3 and 4, the habitat is enclosed by means of screen assemblies 37 which are suitably attached to the external edges of the frame 34 by tamper-resistant hold-downs. For example, each screen assembly may have a plastic outer frame, a plastic inner frame and a netting material trapped between the frame. Frames may be held together by stainless steel screws or other suitable fasteners. Screen assemblies will be of different sizes depending upon whether they are to enclose the sides, the bottom or the top. Preferably both the front and rear screens are designed to be easily removed to gain access to the panels for removal, cleaning, culling of abalone, or the like.

FIG. 3 illustrates a single-level habitat while FIG. 4 illustrates a two-level habitat adapted to receive two rows of panels 27. The upper region of the habitat includes a roof-like top 24 which is fitted with a feed hose nozzle receiving mechanism (not shown). The feed mechanism allows a robot-assisted tube or hose to be detachably connected to the habitat to feed food into the space between the top edge of the panels and the top 24 of the habitat.

Figure 8:
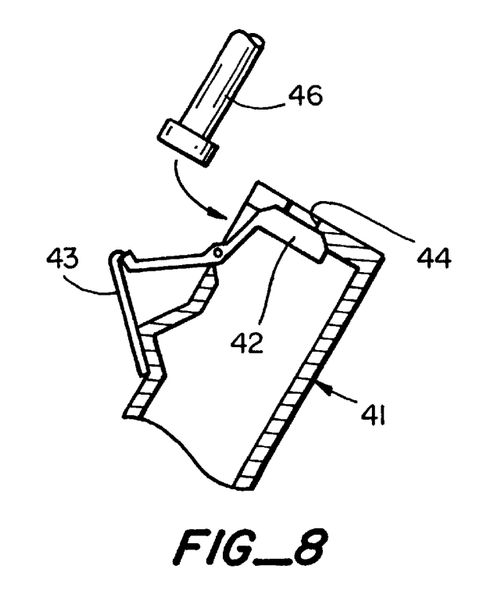
FIG. 8 is an enlarged view of the habitat feed mechanism and baffle system at the end of the feed entry port which cooperates with the feed nozzle to deliver and distribute food.
Figure 9:
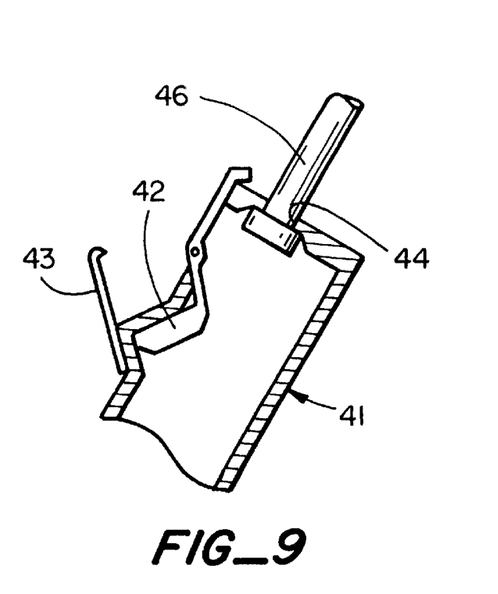
FIG. 9 is an elevational view of the feed mechanism and baffle system with the feed nozzle connected for supplying feed into the habitat.

Referring to FIGS. 8 and 9, a suitable feed mechanism is illustrated. The mechanism is attached to the top with a spout 41 extending upwardly. The spout may be cone-shaped to guide the feed end of the hose into locked position. The mechanism includes a pivoted paddle 42, which in its first position is shown in FIG. 8, is held by latch 43 to close the opening 44 which extends into the space between the top 24 and the panel assembly. When the nozzle 46 of the hose 17 is manipulated by the ROV to move through a slot into engagement with the feed mechanism. The paddle is rotated clockwise as the nozzle 46 slides through the slot and seats into the opening 44 as shown in FIG. 9. The ROV is conventional and includes thrusters, lights, camera, etc. for locating and placing the end of the nozzle into engagement with the feed mechanism at the top of the habitat. The top of the habitat is provided with a plurality of baffles (not shown) to assist with the distribution of food as it is pumped through the nozzle into the upper part of the habitat. The baffles are positioned during assembly of the habitat, ensuring fill distribution of food throughout the habitat. Typical baffles are shown with respect to the alternate type habitat to be described.

Figure 10:
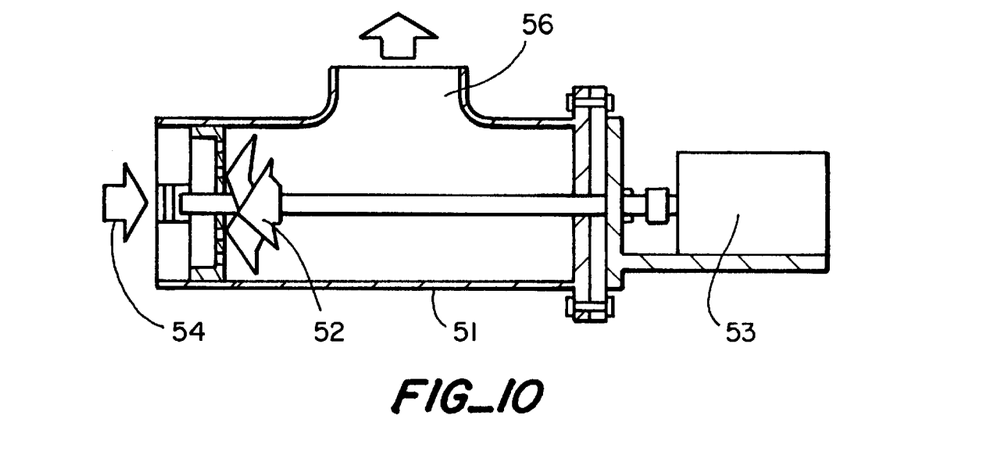
FIG. 10 is a sectional view of a chopper for processing and controlling the size of kelp delivered to the habitats.

A suitable feed processing assembly is illustrated in FIG. 10. The assembly includes a housing 51 with cutting blades 52 driven by variable-speed motor 53 to thereby control the speed of the cutting blades and the size of the feed stock. The feed, such as kelp, is pumped into the processing assembly by a pump (not shown) as indicated by arrow 54. The chopped or processed feed which is pumped into the processor then flows from the outlet 56 connected to the hose end through the hose to the nozzle 46.

Figure 11:
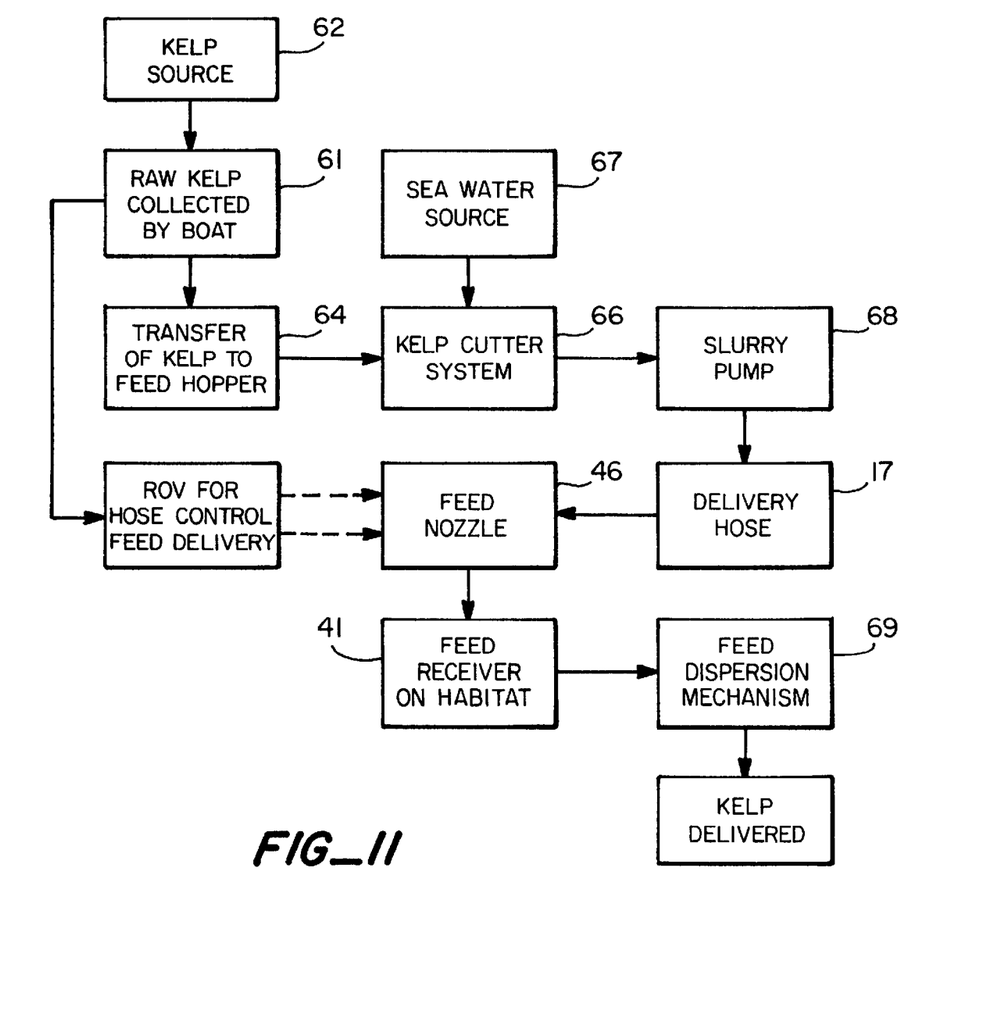
FIG. 11 is a block diagram of the habitat feed delivery system.
Figure 12:
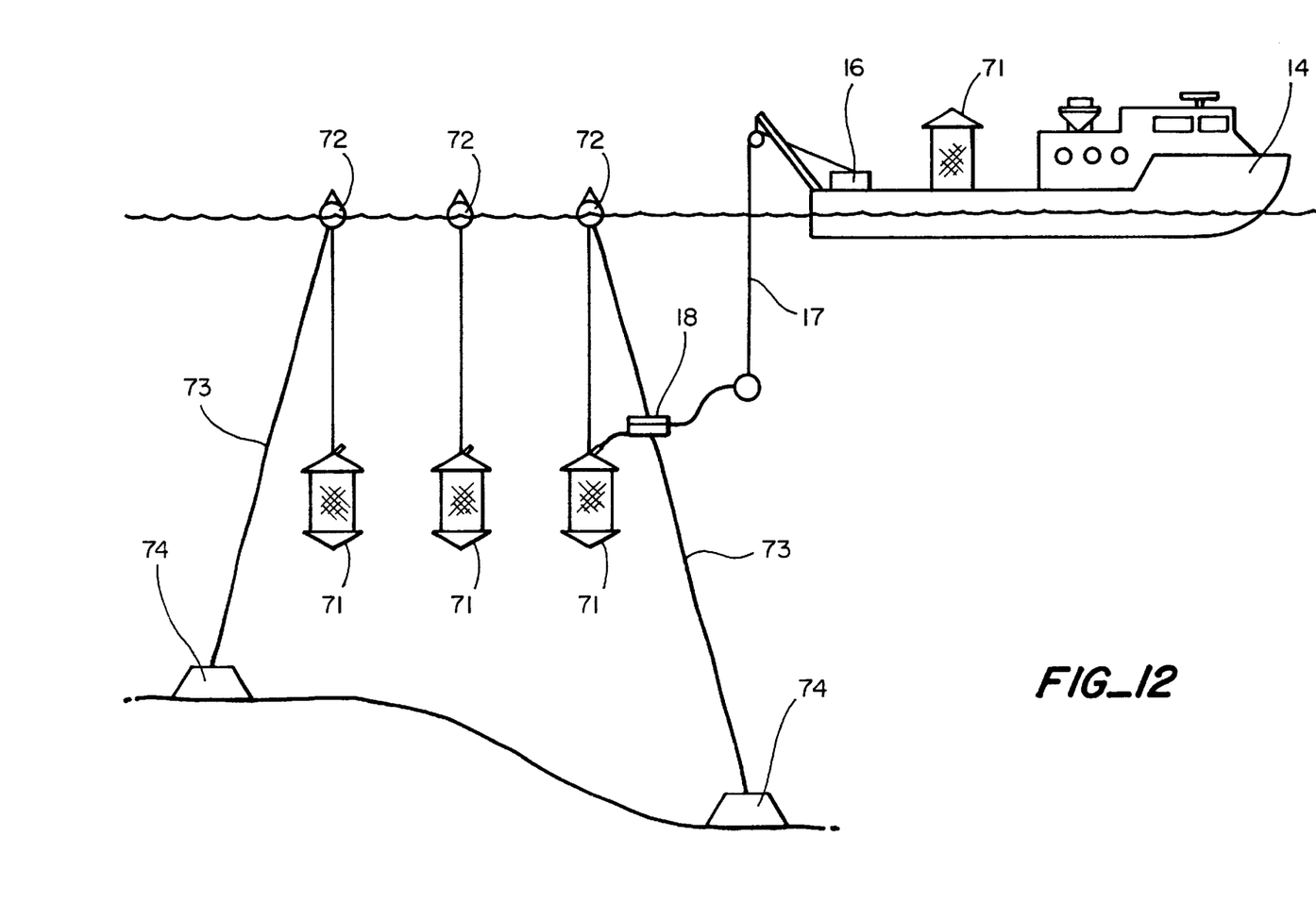
FIG. 12 is a schematic view of an aquaculture form employing cylindrically shaped habitats suspended from a line.
Figure 13:
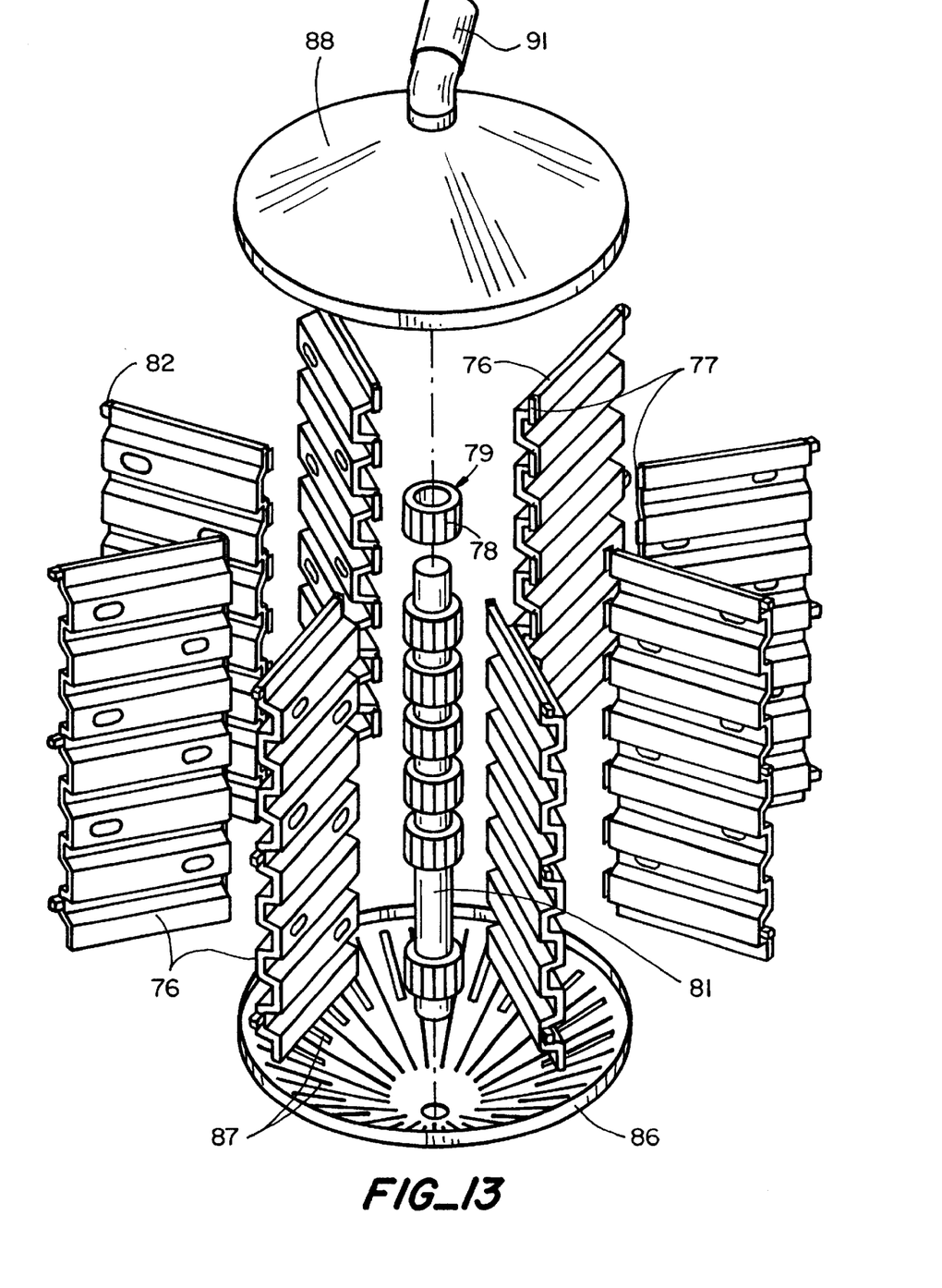
FIG. 13 is an exploded perspective view of a cylindrical habitat with panels in accordance with another embodiment of the present invention.

The flow diagram of FIG. 11 illustrates the food gathering, processing and delivery process. Raw kelp is collected by the boat 61 from kelp beds 62. The kelp is pumped or transferred 64 into the input 54 of the processor 51 where the kelp is cut up 66 and mixed with sea water 67. The kelp and sea water slurry is pumped 68 into the delivery hose 17 and to the feed nozzle 46. The ROV connects the nozzle 46 to the feed mechanism 41 on the habitat where it is dispersed 69 and delivered into the habitat cells 31.

Figure 14:
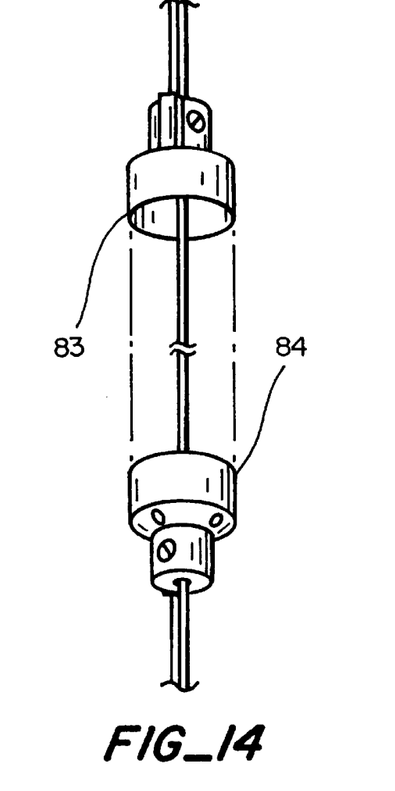
FIG. 14 is a perspective view of the spar mount for the cylindrical habitat of FIG. 11.
Figure 15:
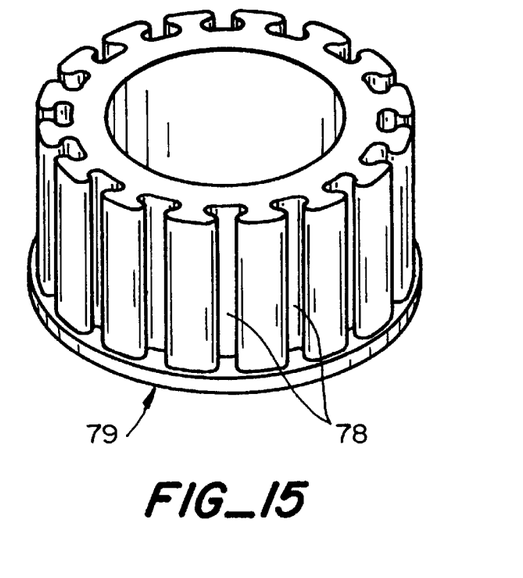
FIG. 15 is a perspective view of a panel mounting hub.
Figure 16:
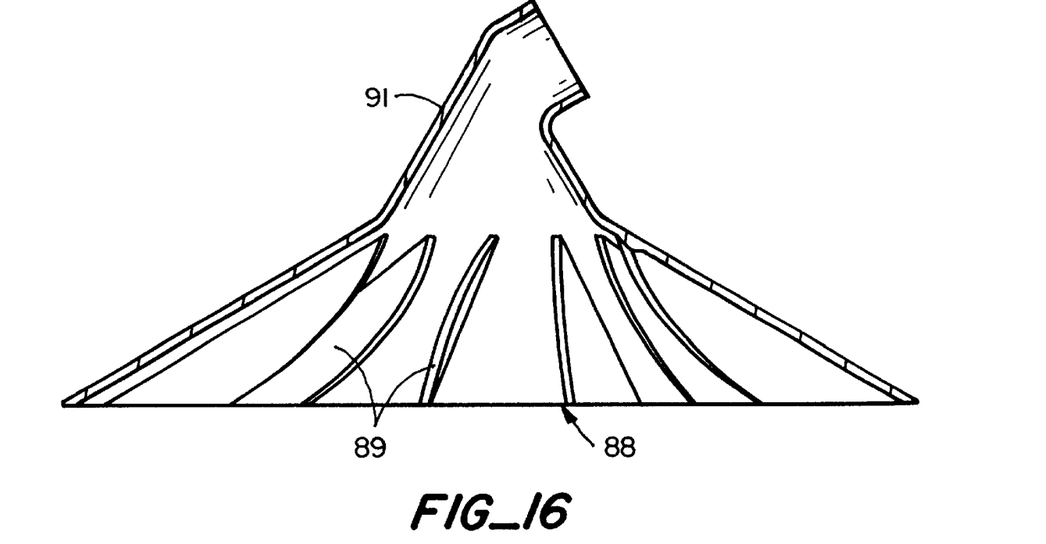
FIG. 16 is a sectional view of the top of the habitat of FIG. 13.

An alternate style habitat 71 is shown suspended from buoys 72 connected to line 73 attached to anchors 74, a so-called long line. A habitat is shown in more detail in FIGS. 13–16. The habitats include a plurality of corrugated panels 76. It is apparent that the panel design can be used in the habitat described above and that the panels described above can be used in this habitat. The panels provide surfaces for the mollusks to congregate. One end of the panels is provided with T-shaped keys 77 which are adapted to slide onto grooves or mounting key-ways 78 on the panel mounting sleeve or hubs 79, FIG. 15, carried by a spar 81. The panels can be easily mounted and removed. The other ends of the panels include tabs 82 for mounting a protective screen around the assembled habitat to provide a cylindrical habitat with pie-shaped cells. Spar mounts 83 and 84, FIG. 14, are secured to the end of the spar 81 and provide means for receiving the lines which connect the habitat to the buoys and to anchors if they are used to hold individual habitats. Alternative designs can be employed by making panels similar to the rectangular system and including through holes across the width that are then used as the mounting attachments to radial rods from the spar of the buoy (not shown), 2 rods per panel.

A conical habitat bottom 87 is secured to the lower end of the spar 81. The bottom is provided with slots or openings 88 which permit the discharge of debris. The habitat included a conical top 88 which is provided with vanes 89, FIG. 16, which cause the feed to disperse so that it is delivered to the habitat cells. The input 91 includes a feed mechanism (not shown) of the type described above for receiving the feed line nozzle.

There has been provided an aquaculture farm system, structure and method which provides for unique, simple, economical cultivation and production of mollusks, particularly abalone.

The foregoing descriptions of specific embodiments of the present invention are presented for the purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A system for the cultivation of mollusks of the type which includes a habitat for housing the mollusks for feeding and protection from predators and a tether for suspending the habitat in the ocean above the ocean floor, characterized in that said habitat includes a plurality of vertically-arranged, removable molded panels forming cells within the habitat, said panels including openings so that feed and mollusks can travel from one cell to an adjacent cell through said openings, a feeding system employing a feed pump and feed processing means at the surface of the ocean, and a hose having one end adapted to be detachably coupled to a selected habitat, and the other end to the feed processing means, whereby a number of habitats can be selectively fed from the surface of the sea.

2. A system as in claim 1 wherein the said one end of the hose is carried by a remotely-operated vehicle which guides the end for detachable coupling to the habitat.

3. A system as in claim 1 or 2 in which the pump is carried on a vessel which can be navigated to couple the hose to selected spaced habitats.

4. A system as in claim 1 in which the panels are rectangular with horizontally-extending ribs and openings to provide communication between cells.

5. A system as in claim 1 in which the panels are removable and are supported to extend parallel to one another to form cells.

6. A system as in claim 1 in which the panels are supported by a spar to extend radially.

7. A system for cultivation of mollusks including:

a plurality of spaced habitats including a mollusk food receiving mechanism, means for positioning the habitats above the ocean floor, a sea going vessel, a mollusk food delivery system carried by said vessel, a conduit having one end connected to receive mollusk food from said delivery system and another end for delivering food sequentially to individual habitats, and a remotely operated vehicle for connecting said another end of said conduit to said feed mechanism of selected habitats to deliver food into said selected habitat.

8. A system as in claim 7 in which each of said habitats include a plurality of panels dividing the habitat into cells, and means for distributing the delivered food to said cells.

9. A system as in claim 7 in which a framework slidably receives said panels to support them in side-by-side parallel relationship.

10. A system as in claim 7 in which said panels are supported and extend radially outwardly from a supporting hub.

* * * * *